(12) United States Patent
Shrivastava

(10) Patent No.: US 10,922,096 B2
(45) Date of Patent: Feb. 16, 2021

(54) REDUCING SUBSEQUENT NETWORK LAUNCH TIME OF CONTAINER APPLICATIONS

(71) Applicant: VMware, Inc., Palo Alto, CA (US)

(72) Inventor: Aditya Shrivastava, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 169 days.

(21) Appl. No.: 15/908,589

(22) Filed: Feb. 28, 2018

(65) Prior Publication Data
US 2019/0265987 A1 Aug. 29, 2019

(51) Int. Cl.
*G06F 9/455* (2018.01)
*G06F 9/445* (2018.01)
*G06F 9/50* (2006.01)
*G06F 9/4401* (2018.01)
*G06F 12/0802* (2016.01)

(52) U.S. Cl.
CPC ........ *G06F 9/44584* (2013.01); *G06F 9/4411* (2013.01); *G06F 9/44521* (2013.01); *G06F 9/45558* (2013.01); *G06F 9/5016* (2013.01); *G06F 12/0802* (2013.01); *G06F 2009/45562* (2013.01); *G06F 2009/45579* (2013.01); *G06F 2009/45583* (2013.01)

(58) Field of Classification Search
CPC .................................................. G06F 9/45533
USPC ........................................................... 718/1
See application file for complete search history.

(56) References Cited

U.S. PATENT DOCUMENTS

| 6,032,240 | A | * | 2/2000 | Brown | G06F 9/5016 |
| | | | | | 711/103 |
| 9,069,607 | B1 | * | 6/2015 | Gopalakrishna Alevoor | ............. |
| | | | | | G06F 16/178 |
| 9,575,774 | B2 | * | 2/2017 | Clark | G06F 9/445 |
| 2002/0112150 | A1 | * | 8/2002 | Lawing | H04L 41/044 |
| | | | | | 713/1 |
| 2003/0192033 | A1 | * | 10/2003 | Gartside | G06F 8/61 |
| | | | | | 717/126 |
| 2004/0177319 | A1 | * | 9/2004 | Horn | G06F 16/22 |
| | | | | | 715/205 |
| 2009/0210441 | A1 | * | 8/2009 | Mercer | G06Q 10/107 |
| 2010/0037235 | A1 | * | 2/2010 | Larimore | G06F 9/455 |
| | | | | | 719/312 |
| 2011/0184993 | A1 | | 7/2011 | Chawla et al. | |

(Continued)

OTHER PUBLICATIONS

U.S. Appl. No. 15/655,305, filed Jul. 20, 2017.

*Primary Examiner* — Mehran Kamran
(74) *Attorney, Agent, or Firm* — Patterson + Sheridan, LLP

(57) ABSTRACT

The disclosure provides an approach for launching a virtualized application, including (i) responsive to a first event occurring prior to any event for launching the virtualized application after user logon, executing a driver to fetch a subset of the files of the virtualized application from the network storage into system memory of the computer system; and (ii) responsive to a second event corresponding to a launch of the virtualized application, instantiating an execution space for the virtualized application and loading at least one of the fetched files into the system memory for execution. The driver maintains a map between (1) a file ID of the at least one of the fetched files and (2) a value of a pointer that points to a data structure referenced when caching the at least one of the fetched files.

20 Claims, 7 Drawing Sheets

(56) References Cited

U.S. PATENT DOCUMENTS

| | | | | |
|---|---|---|---|---|
| 2011/0282868 A1* | 11/2011 | Ishii | G06F 16/93 | 707/722 |
| 2012/0005237 A1* | 1/2012 | Obata | G06F 9/45537 | 707/798 |
| 2012/0089666 A1* | 4/2012 | Goswami | G06Q 10/103 | 709/203 |
| 2014/0059525 A1* | 2/2014 | Jawa | G06F 21/53 | 717/162 |
| 2014/0245444 A1* | 8/2014 | Lutas | G06F 12/109 | 726/24 |
| 2014/0289731 A1* | 9/2014 | Wei | G06F 9/48 | 718/100 |
| 2015/0227567 A1* | 8/2015 | Zamir | G06F 16/188 | 709/223 |
| 2015/0356003 A1 | 12/2015 | Koh et al. | | |
| 2016/0012075 A1* | 1/2016 | Ukai | G06F 16/183 | 707/827 |
| 2017/0243001 A1* | 8/2017 | Jawa | G06F 21/53 | |
| 2017/0244749 A1* | 8/2017 | Shulman | H04L 63/1441 | |
| 2017/0249252 A1* | 8/2017 | Elias | G06F 12/023 | |
| 2017/0308367 A1* | 10/2017 | Clothier | G06F 9/445 | |
| 2019/0028335 A1* | 1/2019 | Shrivastava | H04L 41/0806 | |

* cited by examiner

REDUCING SUBSEQUENT NETWORK LAUNCH TIME OF CONTAINER APPLICATIONS

CROSS-REFERENCE TO RELATED APPLICATION(S)

This application is related to U.S. patent application Ser. No. 15/655,305, filed Jul. 20, 2017 and entitled "Reducing Initial Network Launch Time of Container Applications," which is incorporated herein by reference in its entirety.

BACKGROUND

Application virtualization is a generally known technique for decoupling an application from its underlying operating system to eliminate application conflicts and streamline application delivery and management. One example of a solution that provides application virtualization is ThinApp®, made available by VMware, Inc. of Palo Alto, Calif. A virtual application is generated by encapsulating application resources into a virtual application package that can be deployed, managed, and updated independently from the underlying operating system (OS). The package itself is enclosed within a virtualized container file. The application package includes an executable virtualization layer logically interposed between the OS and the application, providing a sandbox-type of environment (sometimes referred to as a "virtualized environment") isolated, or partially isolated, from the underlying OS or other applications. As such, the virtual applications do not make any changes to the underlying OS and continue to behave the same across different configurations for compatibility, consistent end-user experiences, and ease of management.

As stated, virtualized application packages that encapsulate applications are able to isolate applications from underlying operating systems. Benefits of virtualizing within virtualized application packages files include the ability to run the applications on various versions of operating systems, independent of whether the application would be installable on that version of the operating system otherwise. For example, if an application is compatible with Microsoft Windows® version 7 but not with Microsoft Windows® version 10, the application can be packaged into a virtualized application package that that runs on version 10, but where the files within the package create a version 7 runtime environment for the application. The virtualization layer merges the underlying physical and virtual resources to fool an application into thinking that it is running as if it were fully installed.

Virtualized application software ideally does not have any pre-installed components and does not require the installation of device drivers, thus allowing applications to run from USB flash drives or network shares without requiring administrator rights. Virtualized application software, such as ThinApp®, is also able to scan a system before and after an application's installation and create a portable virtualized container, containing a virtualized application package, based upon changes made to the system files and registry.

A virtualized application package on remote network storage provides storage savings. However, the use of a virtualized container stored in network storage can result in delays caused by network congestion.

SUMMARY

Embodiments provide a method of launching a virtualized application, including (i) responsive to a first event occurring prior to any event for launching the virtualized application after user logon, executing a driver to fetch a subset of the files of the virtualized application from the network storage into system memory of the computer system; and (ii) responsive to a second event corresponding to a launch of the virtualized application, instantiating an execution space for the virtualized application and loading at least one of the fetched files into the system memory for execution. The driver maintains a map between (1) a file ID of the at least one of the fetched files and (2) a value of a pointer that points to a data structure referenced when caching at least one of the fetched files.

Further embodiments include a non-transitory computer-readable storage medium storing instructions that, when executed by a computing device, cause the computing device to perform the method set forth above, and a computing device programmed to carry out the method set forth above.

DETAILED DESCRIPTION

Figure 1:
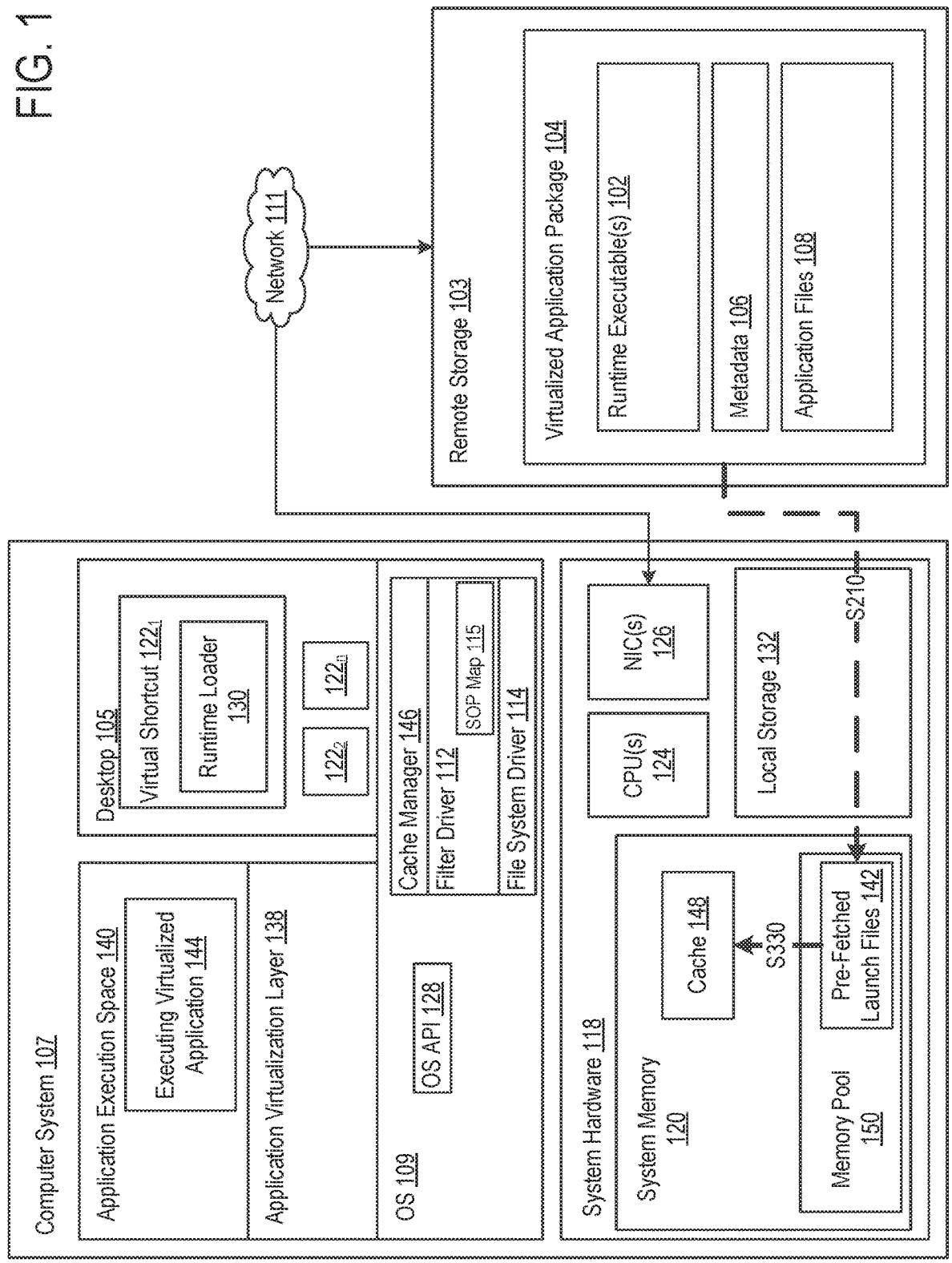
FIG. 1 is a block diagram of a computer system in which embodiments may be carried out.

FIG. 1 is a block diagram of a computer system 107 in which embodiments may be carried out. Computer system 107 communicates with remote storage 103 via network 111, which is, for example, a wide area network (WAN) or a public network such as the Internet. Computer system 107 includes system hardware 118 and operating system (OS) 109. System hardware 118 includes system memory 120, non-volatile local storage 132, one or more central processing units (CPUs) 124, and one or more network interface controllers (NICs) 126 by which computer system 107 is connected to network 111. Operating system 109 includes a software stack through which input/output operations (IOs) are carried out. This software stack includes a cache manager 146 at the top, a filter driver 112, and then a file system driver 114, which is at the bottom. Read and write calls made to OS APIs 128 are processed through this software stack. File system driver 114 is used to access and manage a file system (not shown) for computer system 107.

Remote storage 103 includes persistent storage in which one or more virtualized application packages are stored. In the embodiment illustrated herein, virtualized application package 104 is illustrated as stored in remote storage 103. In one embodiment, remote storage 103 is network-attached storage (NAS). Virtualized application package 104 includes a number of files, including runtime executable 102, metadata 106, and application files 108. In an embodiment, the files of virtualized application package 104 may be organized and managed by a file system (not shown) of computer system 107. In another embodiment, remote storage 103 may have its own file system (not shown), and the file system of computer system 107 works in conjunction with the file system of remote storage 103 to conduct file operations on files within remote storage 103. The file operations include create, read, update, and delete (CRUD) operations.

Virtualized application package 104 is typically read-only and cannot be modified. User-specific changes are stored into a separate file (not shown). Runtime executable 102 represents executable code that implements an application virtualization layer 138 between an executing virtualized application 144 and operating system 109. That is, application virtualization layer 138 provides the sandbox-type of environment (virtualized environment) that is isolated from the underlying OS or other applications.

Metadata 106 contains file names, an offset value (e.g., in bytes) identifying a start location of a corresponding file within virtualized application package 104, as well as the length of the corresponding file, also in bytes. Each file packaged in virtualized application package 104 can be located by traversing a file directory within the metadata 106 to identify an offset and length, and therefore the location, of the corresponding file.

Virtualized application package 104 may also contain configuration settings (not shown). Configuration settings is a feature of virtualized application package 104 that allows an administrator, i.e., a person creating or deploying virtualized application package 104, to alter the behavior and/or impose restrictions on the use of virtualized application package 104. These restrictions are used to enforce security policies, access restrictions, or licensing limitations.

Application files 108 are files of the virtualized application, e.g., executable code of the virtualized application and other files required by the executable code. For example, in order to execute the application, Microsoft Word®, on Microsoft Windows®, the files that would be required include an executable code "winword.exe," DLL files such as NTDLL.dll and shell.dll, and various registry files.

In one embodiment, the virtualized application is launched by double-clicking on a shortcut 122 corresponding to the virtualized application. The shortcut is created when the virtualized application is deployed on a desktop 105. When the shortcut is accessed (e.g., user double clicks on the shortcut), runtime loader 130 loads and executes runtime executable 102, which instantiates virtualized application execution space 140 for the virtualized application. The details of launching the virtualized application in response to user access of the shortcut are described below in conjunction with FIG. 3.

In addition to creating virtualized application execution space 140, runtime executable 102 also loads application files 108 into system memory 120 and maps the loaded application files in virtualized application execution space 140. However, for the initial launch of the virtualized application, not all files of the virtualized application need to be loaded into system memory. The files that are needed for the initial launch are launch files. Launch files represent a subset of files needed to execute the virtualized application. A list of launch files for a particular virtualized application is created by one of several methods which are described below. As used herein, "initial launch" means the first launch of an application after user login to computer system 107.

System memory 120 includes an area reserved for cache 148. Cache 148 is reserved by operating system 109, in particular, cache manager 146. Cache manager 146 stores data that are read or written pursuant to IOs in cache 148 for access without issuing the IOs to storage.

Operating system 109 manages system hardware 118 and provides services for computer applications executing on computer system 107. According to embodiments, operating system 109 may be any of a number of commercially available operating systems, such as Microsoft Windows®, Linux®, or the OS X operating system from Apple, Inc. In embodiments where computer system 107 is a computer that provides a virtualized computing platform, OS 109 may be a hypervisor that supports the execution of virtual machines (VMs) on computer system 107. One example of such a hypervisor is VMware's ESX®.

Filter driver 112 is a driver customized according to embodiments. Filter driver 112 intercepts all calls to file system driver 114 and either forwards the calls unmodified, forwards the calls modified, or answers the calls, as further described below with reference to FIGS. 3 and 4. Filter driver 112 is loaded upon user login to computer system 107. In one embodiment, when filter driver 112 is loaded, it performs a pre-fetching process 200 of launch files as further described below in conjunction with FIG. 2.

Filter driver 112 maintains a section object pointer (SOP) map 115. SOP map 115 maps the file name property (or other unique identifier of a file, such as an ID) of a file object to the section object pointer value of that file object. A "section object pointer" is one of the "members" or "properties" of a file object. For example, a file object may include the property "file name," which is a string representation of a name of a file in memory 120 referenced by the file object. Another exemplary property of a file object may be "origin," which may indicate whether the file associated with the file object originated locally (within computer system 107) or remotely (e.g., within remote storage 103). Another exemplary property of a file object may be "share mode," which is an encoding specifying whether a second process can open the file referenced by the file object for a read, write, or delete access while an initial process is still accessing the file.

Each file object includes a section object pointer. A section object pointer of a file object points to a location within system memory 120 where an SOP data structure associated with the file object is stored. The SOP data structure is referenced by cache manager 146 when caching data associated with the file object. In an embodiment, the SOP data structure contains information as to where in cache 148 the data for a file associated with the SOP data structure should be cached. If two section object pointers of two different file objects point to the same SOP data structure, then cache manager 146 will believe that the two file objects represent the same file, and will cache data for each file in the same location within cache 148 as designated by the SOP data structure, causing the data for one of the file objects to be overwritten.

As used herein, a "file object" is a kernel-level temporary reference (typically a number) assigned by OS 109 to a system resource, e.g., a file, that an application has asked OS 109 to open. The file object is used by kernel-level code to access the file and its data. However, a user mode application cannot directly access the file referenced by a file object. Therefore, a user mode application must obtain, from OS 109, a file handle, which is a user mode, application-level version of a file object, before the application can examine or modify the file.

According to embodiments, filter driver 112 uses SOP map 115 to determine the location of an SOP data structure for a file, specifically, to the location of the SOP data structure that was first created at the initial launch of that file. The location (in memory 120) of an SOP data structure for a file is the value of the section object pointer of that file. For each subsequent launch of that file, filter driver 112 replaces the value of section object pointer of a newly created file object for that file. The replacement is with the value of the pointer that points to the SOP data structure from initial launch, as recorded and mapped within SOP map 115, as further described with reference to step S416 of FIG. 4A, below.

In an embodiment where OS 109 is a Windows® system, the SOP data structure may be the "_SECTION_OBJECT_POINTERS" data structure. In such embodiments, the SOP data structure may include three pointers: a Data pointer, a SharedCacheMap pointer, and an ImageSectionObject pointer. The Data pointer may be used to track state information for a file of a file object, the file's data having been cached for non-execution purpose. The SharedCacheMap pointer may be used to track views that are mapped to the file of a file object. The ImageSectionObject pointer may be used to track state information for a file of a file object, the file's data having been cached for an execution purpose.

Operating system 109 also includes various operating system application programming interfaces (OS APIs) 128, which contain functionality allowing operating system 109 to load files for execution. One such OS API 128 of the Microsoft Windows® operating system is NTDLL, which is an API to launch files for execution.

Desktop 105 contains a plurality of virtual shortcuts $122_1$-$122_n$. Virtual shortcuts $122_1$-$122_n$ link to a particular virtualized application within virtualized application package 104. Virtual shortcuts $122_1$-$122_n$ are created by an administrator and may be deployed to computer system 107 at the time of creation of a virtualized application package 104. Each virtual shortcut 122 loads and executes runtime loader 130, which is employed to load the virtualized applications according to embodiments.

As described in background, one issue with launching a virtualized application from remote storage 103 is the length of time to transfer launch files across network 111. Embodiments address this issue by pre-fetching launch files into system memory 120 prior to launching the virtualized application. In one embodiment, this pre-fetching is triggered by upon user logon. In other embodiments, this pre-fetching may be triggered by any user access that results in an IO to file system driver 114, which is intercepted by filter driver 112.

Figure 2:
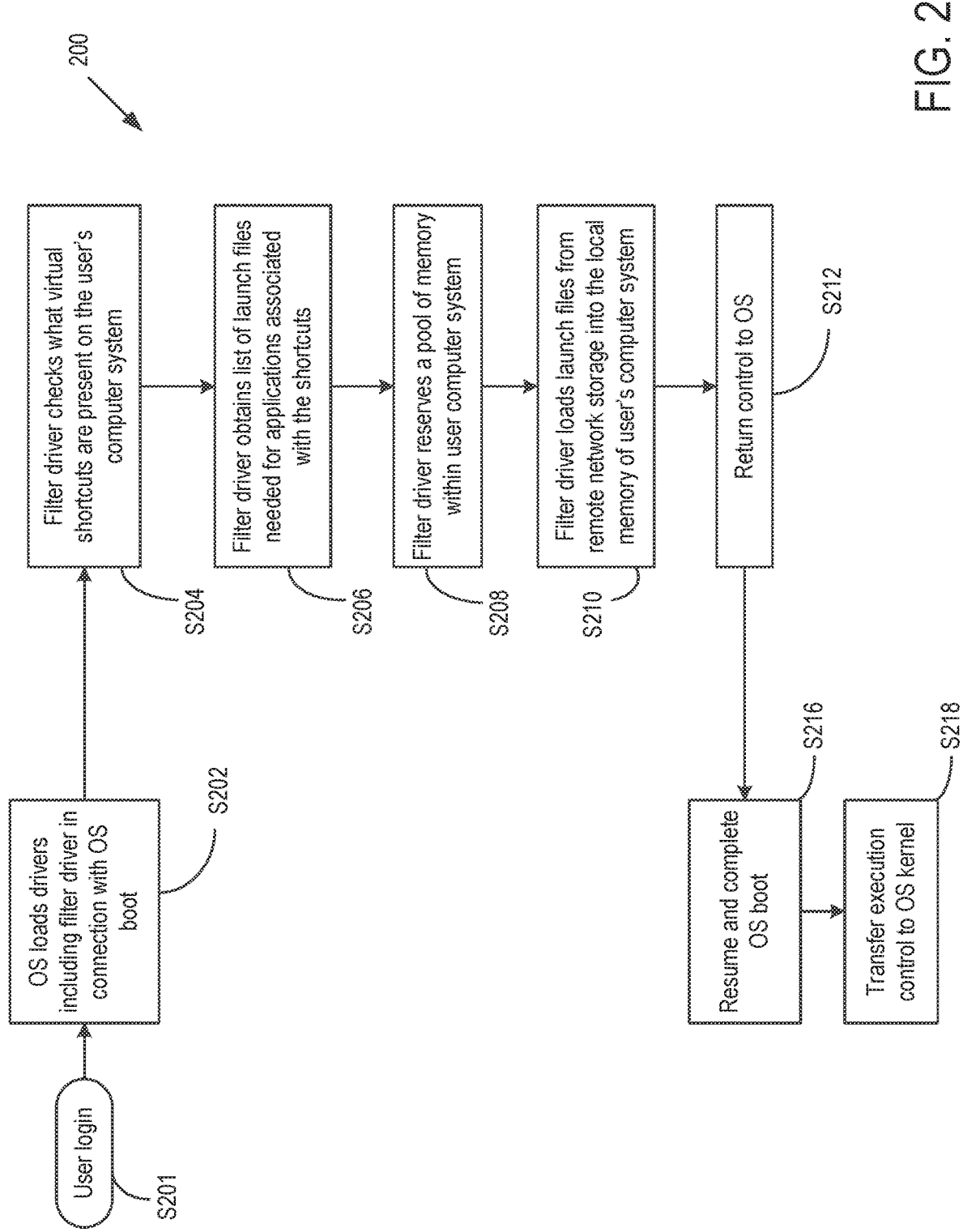
FIG. 2 depicts a process of pre-fetching launch files stored in remote storage, according to an embodiment.

FIG. 2 depicts a pre-fetching process 200 of launch files stored in remote storage 103. Filter driver 112 performs pre-fetching process 200. During pre-fetching process 200, filter driver 112 transfers launch files to computer system 107 prior to a user launching an application associated with the launch files. If launch files are located on computer system 107 when user launches the associated virtualized application, then the launch will be relatively fast compared to if launch files were located on remote storage 103 at time of launch.

Pre-fetching process 200 begins at step S201 when user logs in to computer system 107. Although pre-fetching process 200 is depicted in FIG. 2 as triggered by user login, pre-fetch process 200 may be triggered by other events. For example, the pre-fetching process may be triggered by low demand on CPU 124, network 111, or by other events when pre-fetching launch files might be advantageous.

At step S202, operating system 109 loads filter driver 112 as part of the loading of operating system 109 onto computer system 107. Operating system 109 may load filter driver 112 before its own loading is fully completed, or operating system 109 may load filter driver 112 after its own loading is fully completed.

At step S204, filter driver 112 scans desktop 105 for virtual shortcuts 122. Presence of virtual shortcuts 122 on computer system 107 indicates what virtual applications that user uses.

Filter driver 112 may also scan other components of computer system 107 besides desktop 105 prior to pre-fetching launch files, in order to gain additional information. For example, a computer system 107 may have links to virtual applications in components other than desktop 105. Filter driver 112 may scan these components and add applications associated with located virtual shortcuts to the list of virtual applications for which to perform pre-fetch process 200. Filter driver 112 may also gather information on what virtual applications the user uses at a high frequency as opposed to what virtual applications the user uses at a low frequency. Optionally, filter driver 112 may then only perform pre-fetch process 200 for the frequently used virtual applications and not for the infrequently used virtual applications.

At step S206, filter driver 112 obtains a list of launch files needed for initial launch of application associated with virtual shortcut 222. Before filter driver 112 can retrieve launch files from remote storage 103 and place them onto computer system 107, filter driver 112 must know what files are needed for the initial launch of the virtualized application. Such a list may be obtained by accessing a database, for example.

A list of launch files for a given virtualized application may be created by either of the following two methods. One method is for an administrator to manually create the list and place it in a database accessible by filter driver 112. An administrator can create such a list by taking a pre-launch snapshot of computer system 107. Then, the administrator launches a given application by double-clicking on shortcut 122 and waits until files needed for launch transfer across network 103. The administrator may also wait until an executing virtualized application 144 executes within virtualized application execution space 140 on computer system 107. Administrator compares the pre-launch snapshot to the post-launch computer system 107. Files that are on post-launch computer system 107 but not on the pre-launch snapshot are launch files needed for launch of application associated with shortcut 122. Details of launch files, such as name, size, and location within virtualized application package 104, are identified and placed into a database accessible by filter driver 112. Various software known in the art is available for comparing pre-launch and post-launch state of computer system 107, for the purpose of identifying launch files associated with a particular virtualized application.

Another method for creating a list of launch files is to dynamically create the list upon first launch of a given application contained in virtual package 104 by any user connected by network 111. If filter driver 112 attempts to access a list of launch files for a virtualized application but that list is unavailable, filter driver 112 may wait until this virtualized application is launched by double-clicking on an associated virtual shortcut 122. Upon launch of virtualized application, filter driver 112 tracks what files are transferred over network 206 and used to launch the virtualized application associated with shortcut 122. The list of files identified by filter driver 112 as launch files for a given virtualized application, along with details such as name, size, and offset within virtualized application package file 104, are then added to a database accessible by filter driver 112.

The list of files identified by filter driver 112 as launch files for a given virtualized application can automatically be shared through network 111 to all users connected by network 111. Thus, filter driver 112 in all computer systems 107 connected by network 111 are able to retrieve a list of launch files for a given virtualized application within a virtualized application package 104 upon initial launch of the virtualized application by any user.

At step S208, filter driver 112 reserves memory pool 150 in anticipation of arrival of launch files across network 111. Filter driver 112 determines the size of memory pool 150 by analyzing the list of launch files obtained in step S206. Optionally, step S208 may be performed concurrently with step S210, such that the size of memory pool 150 is adjusted dynamically as launch files arrive from across network 111.

In one embodiment, memory pool 150 includes paged memory and non-paged memory. In other embodiments, memory pool 150 consists only of paged memory or only of non-paged memory. Paged memory is memory whose data that can be swapped between local storage 132 and system memory 120. When paged memory in system memory 120 becomes full or experiences memory stress, operating system 109 moves or "swaps" some of the data in paged memory to local storage 132. When the data moved from paged memory into local storage 132 is needed by computer system 107, operating system 109 swaps that data back into paged memory within system memory 120. Local storage 132 thus acts as a backup to paged memory.

System memory 120 also includes non-paged memory. Non-paged memory is memory whose data cannot be swapped to local storage 132 and thus remains in system memory 120 until no longer needed by operating system 109. Non-paged memory is a limited resource during a session of the operating system 109. Therefore, there is a configurable limit as to how much of memory pool 150 is non-paged memory. Cache 148 is configured in non-paged memory so that data of cache 148 is prevented from swapping out to local storage 132 and offsetting the performance benefits of cache 148.

At step S210, filter driver 112 retrieves launch files from remote storage 103. Filter driver 112 places launch files into memory pool 250 as launch files arrive at computer system 107. Launch files become pre-fetched launch files 142 within system memory 120, as denoted in FIG. 1. Pre-fetched launch files 142 are ready to be loaded into virtualized application execution space 140 when user double-clicks on shortcut 122.

In one embodiment, filter driver 112 places launch files in non-paged memory of memory pool 150 until the user configurable limit is reached, and places the rest of launch files in paged memory of memory pool 150. In another embodiment, filter driver 112 places launch files identified as frequently launched by computer system 107, in non-paged memory of memory pool 150, and places the rest of launch files within paged memory of memory pool 150.

At step S212, filter driver 112 returns control to operating system 109, which completes its loading onto computer system 107 at step S216, if loading of operating system 109 had not completed by that time. At step S218, when operating system 109 fully loads onto computer system 107, kernel (not shown) of operating system 109 gains control of computer system 107 for normal operation of computer system 107.

Figure 3:
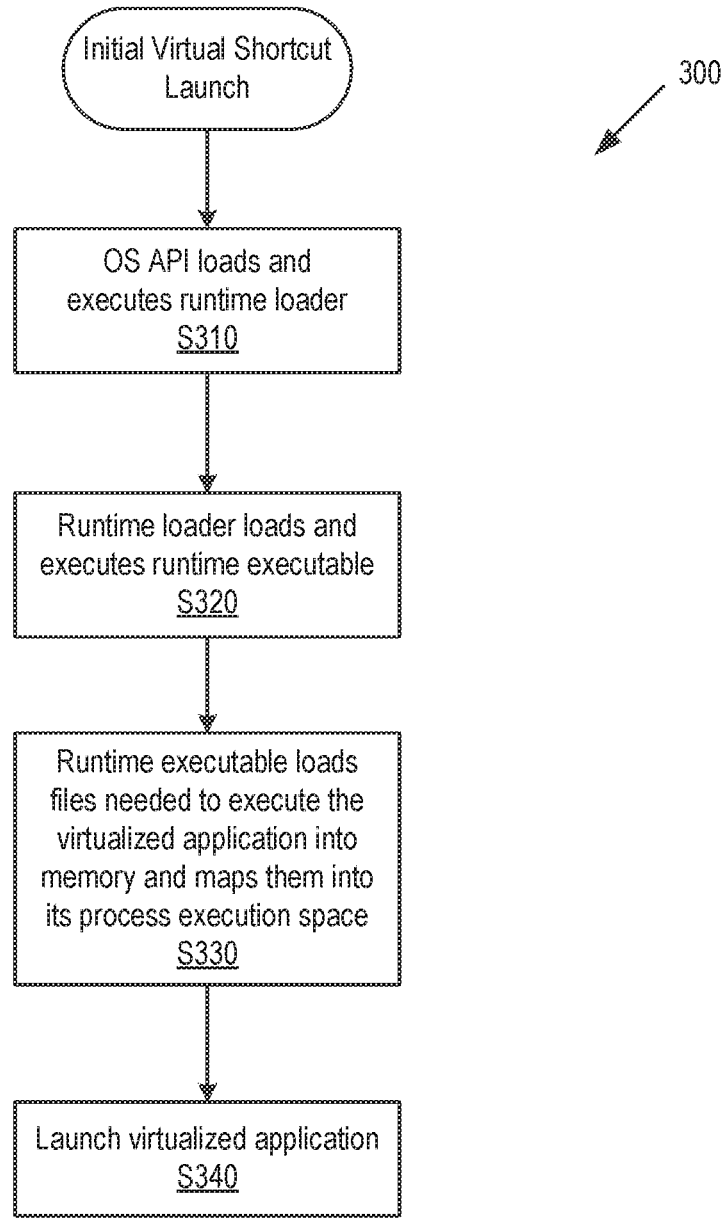
FIG. 3 depicts a process of launching a virtualized application, according to an embodiment.

FIG. 3 depicts a process 300 of launching a virtualized application, according to an embodiment. Process 300 begins at virtual shortcut launch, which occurs when a user double-clicks virtual shortcut 122, and operating system 109 sends a call that creates an address space for a new process within virtualized application execution space 140. Such a call could be, for example, a CreateProcess call in a Microsoft Windows® operating system. The call to create a new process loads OS API 128 (e.g., NTDLL in Microsoft Windows®) into address space of the newly created process.

In step S310, OS API 128 loads and executes runtime loader 130. In step S320, runtime loader 130 makes a call to OS API 128 (e.g., a CreateFile or OpenFile call in Microsoft Windows®) so as to load runtime executable 102, which is among launch files needed for the launching of the virtualized application that is associated with the double-clicked virtual shortcut 122. Responsive to this call, OS API 128 first locates runtime executable 102 and then returns a handle for runtime executable 102.

OS API 128 first checks cache 148 for the presence of runtime executable 102 by making a call to cache manager 146. Because this is an initial launch, OS API 128 will not locate runtime executable 102 in cache 148.

OS API 128 then makes a call to file system driver 114 (e.g., a ReadFile call in Microsoft Windows®), which is intercepted by filter driver 112. If filter driver 112 were not present in computer system 107, then the call would go to the file system driver 114, which would notice that files attempted to be read are network files located on remote storage 103, and file system driver 114 would retrieve runtime executable 102 from launch files located on remote storage 103. However, all calls to file system driver 114 are intercepted by filter driver 112. Thus, the read call to file system driver 114 is intercepted by filter driver 112. Filter driver 112 analyzes the call from OS API 128 and notices that the call is for runtime executable 102, which is present within pre-fetched launch files 142.

Filter driver 112 answers the call from OS API 128 by supplying runtime executable 102 from within pre-fetched launch files 142 and notifying OS API 128, which in turn notifies runtime loader 130 of this action. Filter driver 112 supplies the requested portion of pre-fetched launch files 142 to runtime loader 130 by copying runtime executable 102 of pre-fetched launch files 142 into cache 148. Filter driver 112 then returns the intercepted call and a handle for runtime executable 102 to runtime loader 130 via OS API 128.

After filter driver 112 notifies runtime loader 130 that runtime executable is available, e.g., within cache 148, runtime loader 130 loads and executes runtime executable 102 to create virtualized application execution space 140. Once runtime executable 102 is loaded, runtime executable 102 in step S330 proceeds to load the rest of pre-fetched launch files 142 following a similar process for loading of runtime executable 102 by runtime loader 130, as described above. As a result, each of launch files 142 is mapped in virtualized application execution space 140.

At step S340, runtime executable 102 launches the virtualized application associated with virtual shortcut 122, resulting in an executing virtualized application 144.

After pre-fetched launch files 142 are loaded into application execution space 140, the rest of the files of the virtualized application will transfer as needed from remote storage 103 to computer system 107 to give the user full functionality of the virtualized application associated with virtual shortcut 122.

Subsequently, filter driver 112 optionally unreserves memory pool 150 that had been reserved for pre-fetched launch files 142 within system memory 120. Unreserving memory pool 150 causes pre-fetched launch files 142 to be cleared from or invalidated within memory pool 150 but to remain within cache 148.

Alternatively, to retain launch files for subsequent launches, filter driver 112 does not unreserve memory pool 150. Not unreserving memory pool 150 causes pre-fetched launch files 142 to remain in memory pool 150. Retaining pre-fetched launch files 142 in memory pool 150 is advantageous for subsequent launches because the copy of pre-fetched launch files 142 in cache 148 is cleared from or invalidated within cache 148 by cache manager 146 shortly after the virtual application associated with pre-fetched launch files 142 is closed by the user. As used herein, the term "subsequent launch" refers to a launch of an application that happens after the initial launch and before the user logs out of computer system 107.

FIGS. 4A-4D depict a process 400 of a launching of a virtualized application, according to an embodiment. Process 400 encompasses both an initial launch and a subsequent launch of an application. A result of process 400 is that subsequent launch time of an application is reduced.

Similarly to process 300 of FIG. 3, process 400 begins with virtual shortcut launch, which occurs when a user double-clicks virtual shortcut 122, and operating system 109 sends a call that creates an address space for a new process within virtualized application execution space 140. Such a call could be, for example, a CreateProcess call in a Microsoft Windows® operating system. The call to create a new process loads OS API 128 (e.g., NTDLL in Microsoft Windows®) into address space of the newly created process.

In step S402, OS API 128 loads and executes runtime loader 130. In step S404, runtime loader 130 makes a call to OS API 128 (e.g., a CreateFile or OpenFile call in Microsoft Windows®) to load runtime executable 102, which is among launch files needed for the launching of the virtualized application that is associated with the double-clicked virtual shortcut 122. As seen by runtime loader 130, runtime executable 102 is a remote file located in remote storage 102, because the path specified for runtime executable 102 by the double-clicked virtual shortcut 122 is to remote storage 103. As used herein, a "remote" file is a file whose storage location is outside of computer system 107 (e.g., on remote storage 103) and a "local" file is a file whose storage location is within computer system 107. Runtime loader 130 is not aware that filter driver 112 pre-fetched runtime executable 102 and other launch files in process 200 of FIG. 2. Runtime loader's call to load runtime executable 102 is a remote call, such as CreateFile (\\network\runtime_executable).

Responsive to the call from runtime loader 130, OS API 128 attempts to locate runtime executable 102 so as to return a handle for runtime executable 102. To locate runtime executable 102, OS API 128 makes a call to file system driver 114. The call from OS API 128 to file system driver 114 is similar to the call OS API 128 received from runtime loader 130, for example, CreateFile (\\network\runtime_executable).

In step S406, filter driver 112 intercepts the call from OS API 128 to file system driver 114. Filter driver 112 notices that the load call is for a pre-fetched launch file, specifically runtime executable 102.

In step S408, filter driver 112 sends a call to file system driver 114 to create a file object for a local dummy file. Any local file may be used as the dummy file. For example, the file on local storage 132 that contains code and data for filter driver 112 may be used by filter driver 112 to create the file object. That is, filter driver 112 may create a file object to itself. Importantly, when creating a file object for a local dummy file, a flag or property within the resulting file object indicates that the file is local. The data of a local file object (as opposed to a remote file object) is not immediately cleared from cache 148 by cache manager 146 upon closing of that file. Retaining data of a file within cache 148 after closing reduces launch time of subsequent launches of that same file. Responsive to the call from filter driver 112, file system driver 114 creates the file object for the dummy file and returns the file object to filter driver 112.

In step S409, filter driver 112 associates the file object with runtime executable within an internal table (not shown). That is, filter driver 112 takes note of the file object's unique identifier and associates it with runtime executable 102. This way, when a load or read call is made with this file object as a parameter, by an application to file system driver 114, filter driver 112 will intercept the call, check its internal table to see that the file object is associated with the data for runtime executable 102, and return that data.

In step S410, filter driver 112 checks SOP map 115 as to whether the file being loaded (runtime executable 102) has an entry within SOP map 115. It should be noted that SOP map 115 may not exist until a first entry in SOP map 115 is created. If an entry is present for runtime executable 102, then that indicates that process 400 is in a subsequent launch workflow (i.e., that this is a subsequent launch of the file runtime executable), and process 400 continues to step S416. If an entry is not present, that means that process 400 is in an initial launch workflow, and process 400 continues to step S414.

In step S414, filter driver 112 allocates a new location within system memory 120 for an SOP data structure. Filter driver 112 modifies the section object pointer of the file object from step S408 to point to the allocated location within system memory 120. Filter driver 112 also records an entry within SOP map 115. The entry includes a pointer to the address of the allocated location within system memory 120. In other words, the entry is a copy of the new section object pointer of the file object. Upon a subsequent launch(es), the entry will be used by filter driver in step S416 to modify the section object pointer within a newly created file object to point to the address listed within the entry.

Allocation of a new location at step S414 will allow the data for this file object (i.e., runtime executable data) to be treated as a separate file by cache manager 146 when caching the data within cache 148. If section object pointer of the file object remained as originally set by file system driver 114 in step S408, then cache manager 146 would treat the data for this file object as if it were the data of the dummy file, which is an unwanted result. For example, if filter driver 112 file was used as the dummy file in step S408, and section object pointer remained unchanged, then cache manager 146 may write the data of runtime executable 102 within cache 148 in a way that overwrites cache data of filter driver 112 within cache 148. After step S414, process 400 continues to step S418 of FIG. 4B.

In step S416, filter driver 112 modifies the section object pointer of the file object from step S408 to point to the existing SOP data structure of the file object's file. That is, the entry made at steps S414 during an initial launch of this file is accessed by filter driver 112, and the address for the SOP data structure of the same file is used to replace the address to which the section object pointer of the file object points. The section object pointer now points to the data structure of a previous launch of the same file. Modifying the section object pointer in this way causes cache manager 146 to access cached data of a previous launch within cache 148, resulting in a reduced launch time for subsequent launches of the same container file. Step S416 is reached only if a section object pointer data structure exists for runtime executable 102 from a previous launch. After step S416, process 400 continues to step S418 of FIG. 4B.

In step S418, filter driver 112 returns the file object modified in steps S414 or S416. Filter driver 112 returns the file object to runtime loader 130. In step S420, runtime loader 130 makes a read call to OS API 128 with the file object as a parameter of the call, so as to read the data of runtime executable 102. OS API 128 then makes a call to file system driver 114 to locate the data for runtime executable 102.

In step S422, filter driver 112 intercepts the call from OS API 128 to file system driver 114. Filter driver 112 notices that the read call is for a previously pre-fetched launch file, specifically runtime executable 102. Filter driver 112 notices this by referring to its internal table (not shown) in which it associated in steps S409 the file object with the file being loaded (runtime executable). Rather than returning the file data for which the file object was original created, filter driver 112 will attempt to locate runtime executable 102 in steps S424-S442, and will return runtime executable data in step S444, as described below.

In step S424, filter driver 112 attempts to locate the data for runtime executable 102. Filter driver makes a call to cache manager 146, including the file object as a parameter to the call, so as to request data for runtime executable 102 from cache 148. If this is an initial launch, then the data for runtime executable 102 is within memory pool 150. If this is a subsequent launch, then runtime executable 102 is within cache 148 (unless launch files were cleared from cache 148 by cache manager 146 as per an algorithm for clearing local files from cache 148, as discussed below).

In steps S426, cache manager 146 checks whether data for runtime executable 102 is within cache 148. To find the data, cache manager 146 references the section object pointer of the file object that cache manger 146 was sent in step S424.

Figure 4A:
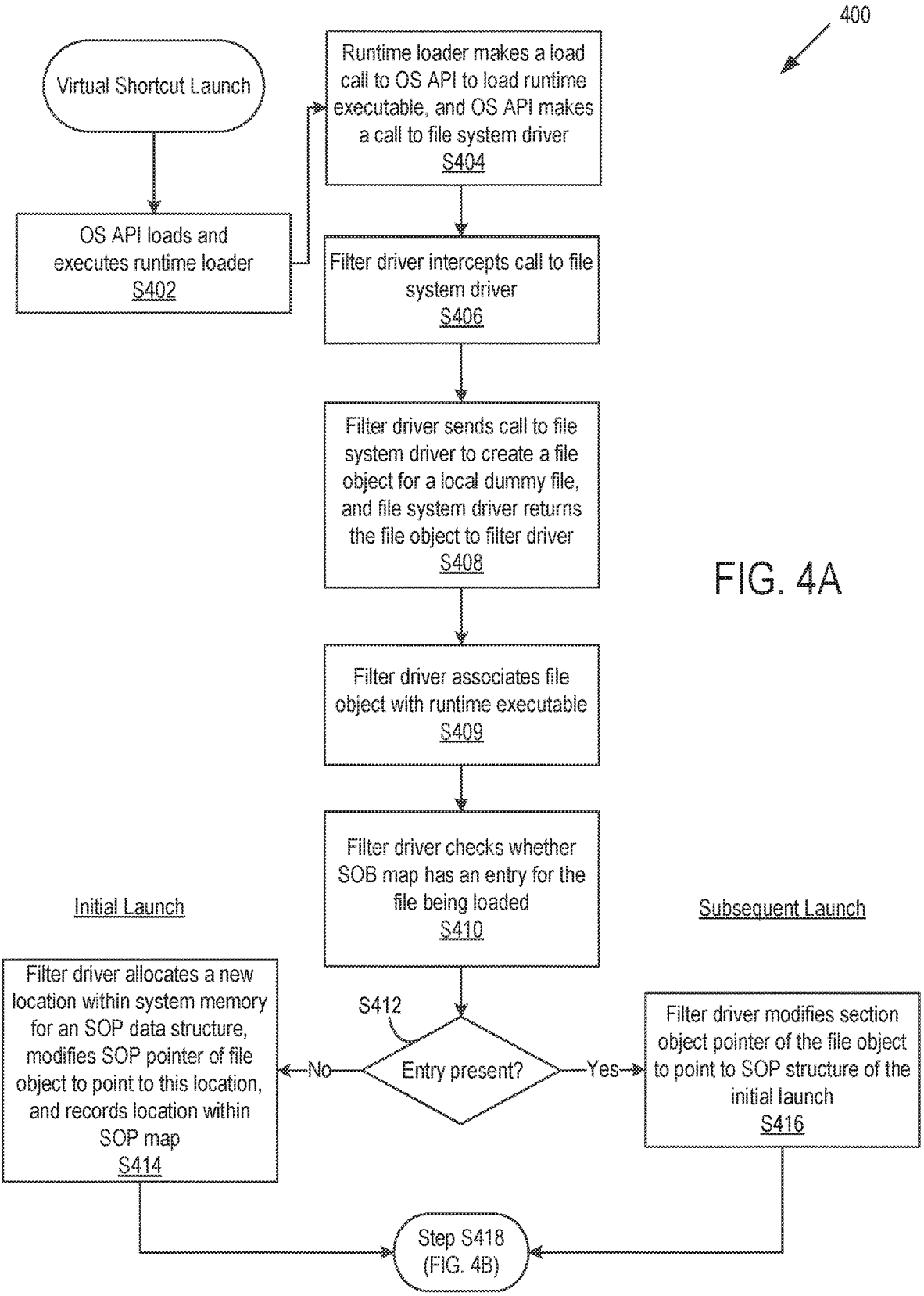
FIGS. 4A-4D depict an alternative process of launching a virtualized application, according to an embodiment.
Figure 4B:
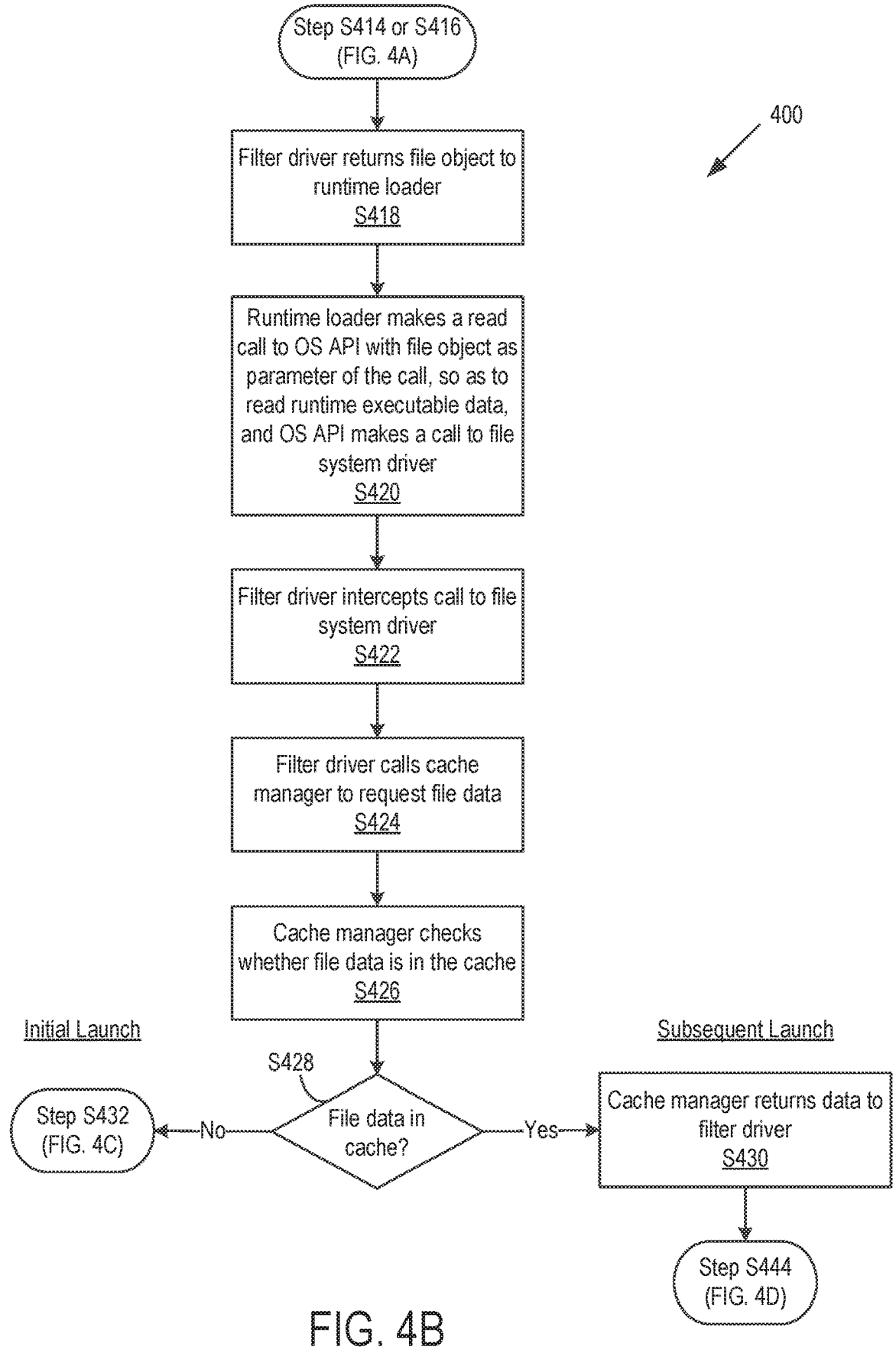

In step S428, cache manager 146 determines whether data for runtime executable 102 is within cache 148. If the data for runtime executable 102 is within cache 148, then in step S430, cache manager 146 returns the data for runtime executable 102 to filter driver 112. In an embodiment, returning the data for runtime executable 102 means returning an address to the location of the data within system memory 120. After step S430, process 400 continues to step S444 of FIG. 4D. Moving from step S430 to S444 skips steps S432 through S442 of FIG. 4C. That is because steps S432 through S442 are for an initial launch of an application, and steps S430 is on a subsequent launch workflow of process 400, as indicated in FIG. 4B.

Figure 4C:
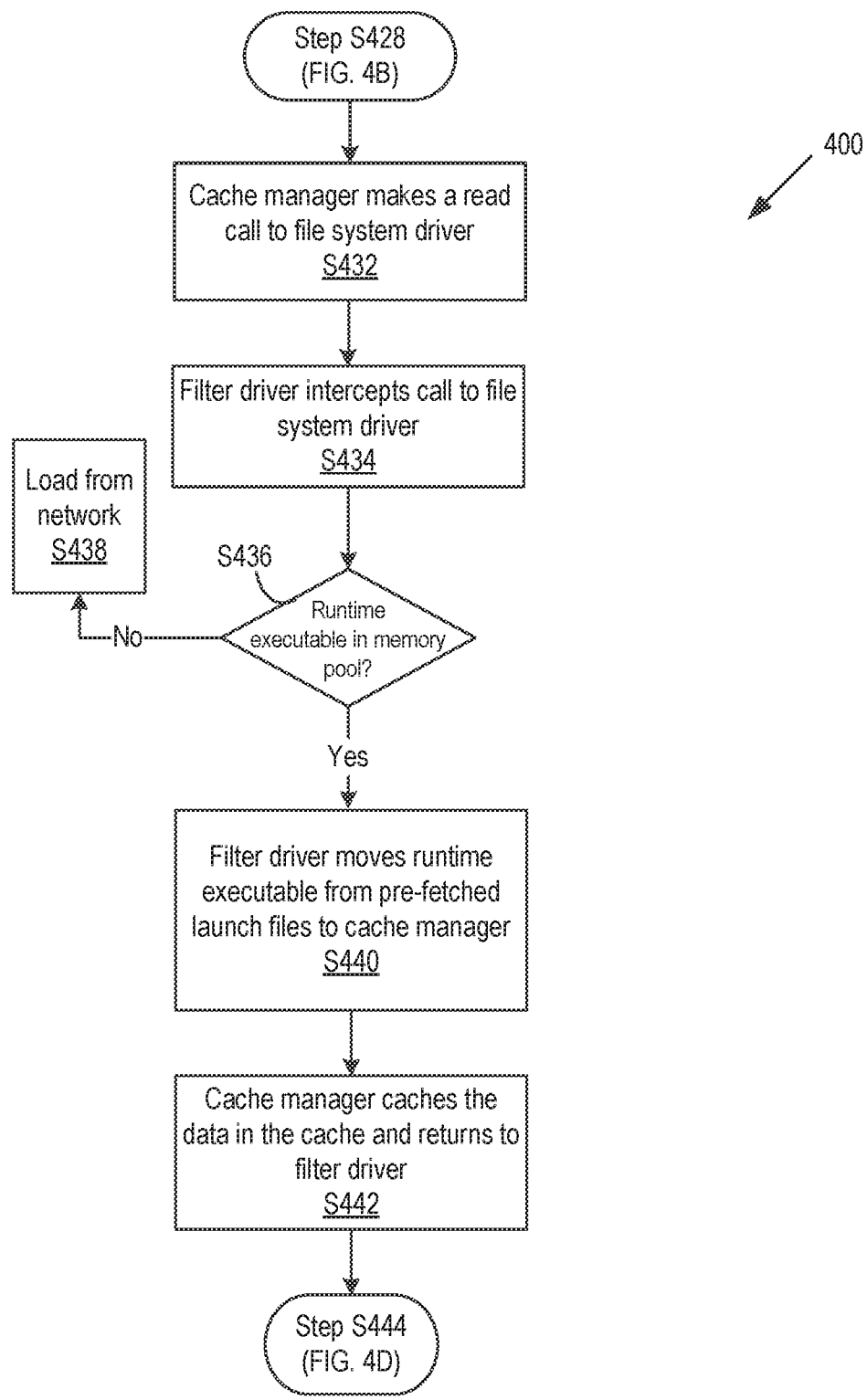

As per step S428, if the data for runtime executable 102 is not within cache 148, then process 400 continues to step S432 of FIG. 4C, which is an initial launch workflow of process 400.

In step S432 of FIG. 4C, cache manager 146 attempts to locate the data for runtime executable 102. Step S432 occurs if cache manager 146 was unable to locate the data within cache 148 in steps S426 and S428. In step S432, cache manager 146 makes a read call to file system driver 114. In an embodiment, the read call contains the file object of step S414 or S416 as a parameter.

In step S434, filter driver 112 intercepts the call from cache manager 146 to file system driver 114. Filter driver 112 notices that the read call is from cache manager for a pre-fetched launch file, specifically runtime executable 102.

In step S436, filter driver 112 determines whether the requested data for runtime executable 102 has been fully pre-fetched from remote storage 103 to memory pool 150. If not, then in step S438, filter driver 112 loads data for runtime executable 102 from remote storage 103 across network 111. If requested data for runtime executable 102 has fully transferred to memory pool 150, as would occur in the normal execution of process 400, then filter driver 112 makes a call to cache manager 146 to transfer the data of runtime executable 102 from memory pool 150 to cache manager 146. Filter driver 112 also passes the file object from step S420 to cache manager 146. After the data is transferred to cache manager 146, filter driver 112 clears the transferred data from memory pool 150.

Figure 4D:
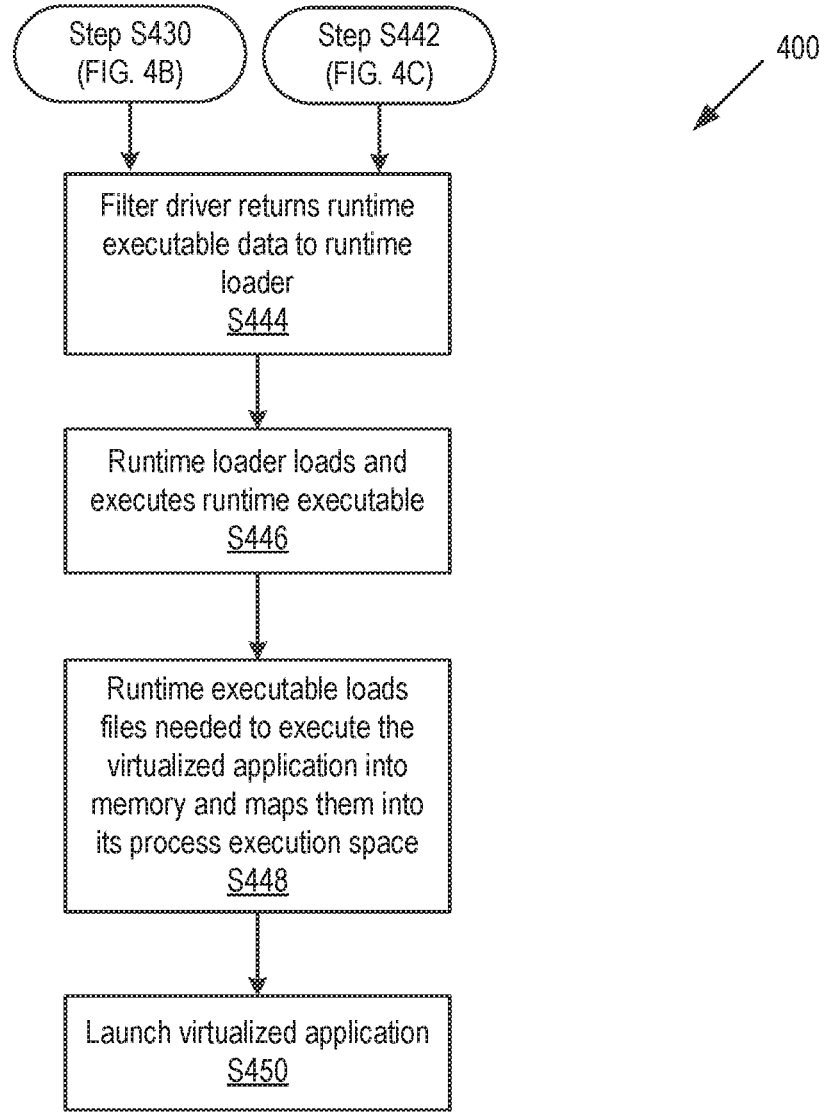

In step S442, cache manager 146 caches the data of runtime executable 102 in cache 148 and updates the section object pointer of the file object to reflect the presence and location of runtime executable data within cache 148. After step S442, the call to cache manager 146 in step S440 returns to filter driver 112, and filter driver 112 regains control of process 400. Process 400 continues to step S444 of FIG. 4D. FIG. 4D depicts steps that are common to both an initial launch workflow and a subsequent launch workflow of process 400.

In step S444 of FIG. 4D, filter driver 112 returns data of runtime executable 102 to runtime loader 130. In step S446, runtime loader 130 loads and executes runtime executable 102 to create virtualized application execution space 140. Once runtime executable 102 is loaded, runtime executable 102 in step S448 proceeds to load the rest of pre-fetched launch files 142 following a similar process for loading of runtime executable 102 by runtime loader 130, as described above. Each of pre-fetched launch files 142 is mapped in virtualized application execution space 140.

In step S450, runtime executable 102 launches the virtualized application associated with virtual shortcut 122, resulting in an executing virtualized application 144. After pre-fetched launch files 142 are loaded into application execution space 140, the rest of the files of the virtualized application begin to transfer from remote storage 103 to computer system 107 to give the user full functionality of the virtualized application associated with virtual shortcut 122.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. In a computer system configured to support execution of a virtualized application, wherein files of the virtualized application are stored in and retrieved from network storage, a method of launching the virtualized application, said method comprising:
   performing a first launch of the virtualized application, wherein the performing of the first launch comprises executing a driver to:
      fetch, from the network storage, a subset of the files of the virtualized application that are required for launching the virtualized application, and
      store the subset of the files in a system memory of the computer system;
   closing the virtualized application;
   performing a second launch of the virtualized application;
   creating a file object for each file of the fetched subset of the files, each file object having a pointer; and
   modifying the pointer of each file object to point to a location in the system memory, the location in the system memory having data stored thereon from a previous launch of the file with which the file object is associated.

2. The method of claim 1, wherein the performing of the first launch further comprises executing the driver to allocate a location within the system memory for a pointer map configured to map between (1) a file ID of at least one of the fetched subset of the files and (2) a value of a pointer that points to a data structure referenced when caching the at least one of the fetched subset of the files.

3. The method of claim 1, wherein subsequent to closing the application, application data remains, in a valid state, in a cache of the computing system.

4. The method of claim 1, wherein the driver is configured to intercept and process input/output operations prior to the input/output operations being processed by a file system driver.

5. The method of claim 1, wherein the executing the driver to fetch the subset of the files occurs responsive to an event occurring prior to any event for launching the virtualized application after user logon.

6. The method of claim 1, wherein the performing the first launch comprises:
   responsive to an event corresponding to a launch of the virtualized application, instantiating an execution space for the virtualized application; and
   loading at least one of the fetched subset of the files into the system memory for execution.

7. The method of claim 6, wherein the subset of the files is fetched into a first location in the system memory and loaded into a second location in the system memory for execution, and wherein the computer system includes a cache managed by the cache manager and configured in the system memory for input/output operations, and the cache includes the second location.

8. The method of claim 7, wherein the subset of the files is moved from the first location to the second location, such that at a time of launch, no more than one copy of the fetched subset of the files is in the system memory.

9. The method of claim 6, wherein the loading further comprises:
intercepting, by the driver, a load call to a file system driver for the at least one of the fetched subset of the files, and responsive to the intercepting, creating a file object for a local dummy file and associating the file object with the at least one of the fetched subset of the files.

10. The method of claim 9, further comprising, allocating space within system memory and modifying a pointer of the file object to point to the allocated space.

11. The method of claim 10, further comprising, making an entry within the driver, the entry comprising the pointer.

12. A non-transitory computer readable medium comprising instructions to be executed in a processor of a computer system configured to support execution of a virtualized application, wherein files of the virtualized application are stored in and retrieved from network storage and the instructions when executed in the processor cause the computer system to carry out a method of launching the virtualized application, said method comprising:
performing a first launch of the virtualized application, wherein the performing of the first launch comprises executing a driver to:
fetch, from the network storage, a subset of the files of the virtualized application that are required for launching the virtualized application, and
store the subset of the files in a system memory of the computer system;
closing the virtualized application;
performing a second launch of the virtualized application;
creating a file object for each file of the fetched subset of the files, each file object having a pointer; and
modifying the pointer of each file object to point to a location in the system memory, the location in the system memory having data stored thereon from a previous launch of the file with which the file object is associated.

13. The non-transitory computer readable medium of claim 12, wherein the performing of the first launch further comprises executing the driver to allocate a location within the system memory for a pointer map configured to map between (1) a file ID of at least one of the fetched subset of the files and (2) a value of a pointer that points to a data structure referenced when caching the at least one of the fetched subset of the files.

14. The non-transitory computer readable medium of claim 12, wherein the driver is configured to intercept and process input/output operations prior to the input/output operations being processed by a file system driver.

15. The non-transitory computer readable medium of claim 12, wherein the executing the driver to fetch the subset of the files occurs responsive to an event occurring prior to any event for launching the virtualized application after user logon.

16. The non-transitory computer readable medium of claim 12 wherein the performing the first launch comprises:
responsive to an event corresponding to a launch of the virtualized application, instantiating an execution space for the virtualized application; and
loading at least one of the fetched subset of the files into the system memory for execution.

17. The non-transitory computer readable medium of claim 16, wherein the loading further comprises:
intercepting, by the driver, a load call to a file system driver for the at least one of the fetched subset of the files, and responsive to the intercepting, creating a file object for a local dummy file and associating the file object with the at least one of the fetched subset of the files.

18. The non-transitory computer readable medium of claim 17, further comprising, allocating space within system memory and modifying a pointer of the file object to point to the allocated space.

19. The non-transitory computer readable medium of claim 18, further comprising, making an entry within the driver, the entry comprising the pointer.

20. A computer system connected to network storage in which a virtualized application package that has been created for a virtualized application is stored, said computer system comprising:
a network interface controller connected to the network storage; and
a processor and system memory, wherein the processor is programmed to carry out a method of launching the virtualized application, said method including:
performing a first launch of the virtualized application, wherein the performing of the first launch comprises executing a driver to:
fetch, from the network storage, a subset of files of the virtualized application, and
store the subset of the files in a system memory of the computer system;
closing the virtualized application;
performing a second launch of the virtualized application;
creating a file object for each file of the fetched subset of the files, each file object having a pointer; and
modifying the pointer of each file object to point to a location in the system memory, the location in the system memory having data stored thereon from a previous launch of the file with which the file object is associated.

* * * * *